Sept. 5, 1950      A. J. WYMAN ET AL      2,521,662
SALT SHAKER
Filed Feb. 7, 1947
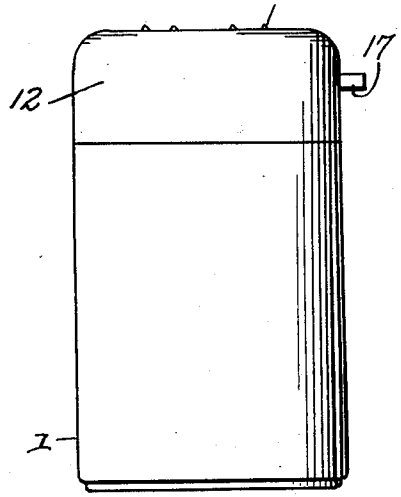
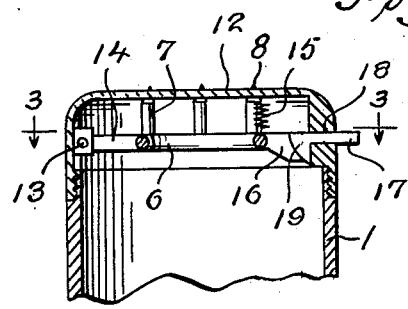
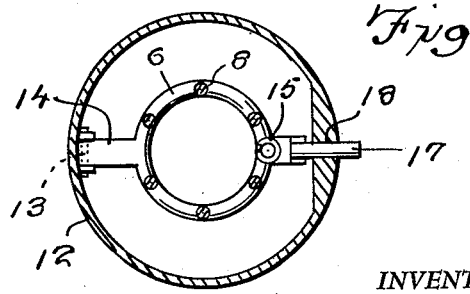
INVENTOR.
Anthony J. Wyman
Roland G. Ziegler
BY Victor J. Evans & Co.
ATTORNEYS Patented Sept. 5, 1950

2,521,662

UNITED STATES PATENT OFFICE 2,521,662

SALT SHAKER

Anthony J. Wyman, Orange, and Roland G. Ziegler, West Orange, N. J.

Application February 7, 1947, Serial No. 727,050

1 Claim. (Cl. 222—508)

Our present invention relates generally to the class of kitchen and table articles of the condiment holder type, and more specifically to an improved salt shaker of the type including a perforated lid, a depressible frame having pins for insertions in the perforations, and spring means for resiliently retaining the pins in the perforations.

The primary object of the invention is the provision of a device of this character that consists of a minimum number of parts which may be manufactured with facility and at low cost of production and assembled conveniently to insure a salt shaker that is sealed to prevent ingress of dampness or moisture to the contents of the container or holder. Means are also provided for clearing the perforations to prevent clogging of salt in the dispensing head or lid of the container, and means are provided for opening the normally closed perforations for dispensing the salt, and for automatically closing the perforations after a dispensing operation.

The invention consists essentially in certain novel features of construction and combinations and arrangements of parts as will hereinafter be described and more specifically pointed out in the appended claim.

In the accompanying drawings we have illustrated one complete example of a physical embodiment of our invention in which the parts are combined and arranged in accord with one mode we have devised for the practical application of the principles of the invention. It will, however, be understood that changes and alterations are contemplated and may be made in the exemplifying drawings and mechanical structures, as is evidenced by the modified form of the invention illustrated in the drawings, within the scope of our claim, without departing from the principles of the invention.

Figure 1 is an exterior view of a salt shaker or condiment holder in which our invention is physically embodied.

Figure 2 is a vertical sectional view of the salt shaker of Figure 1; and

Figure 3 is a horizontal transverse sectional view at line 3—3 of Fig. 2.

In the preferred form of the invention shown in Figs. 1, 2, and 3, we employ a condiment holder 1 in the form of an open top cylindrical container that may be pressed, molded, or otherwise fashioned to appropriate size.

The upper end of the container is provided with external threads to receive the complementary threads of a removable cap 12, and the cap is provided with a series of spaced perforations or holes through which the salt is shaken from the interior of the container.

For controlling the openings or perforations of the cap or lid, a horizontally disposed annular frame or ring 6 is mounted in the container beneath the perforated lid and the depressible ring frame is provided with a number of pins 7 pointed at 8 and corresponding in number with the complementary perforations of the lid.

With the salt shaker turned upside down, the plunger may be pressed into its casing to withdraw the pins from the perforations, and the salt may be shaken as usual through the perforations of the lid. Upon releasing pressure on plunger, the spring projects the plunger and ring frame, and the pins are projected into the perforations to close them against egress of salt and against ingress of moisture.

Various changes and alterations are contemplated in the manufacture of the container, but in this instance, the container or condiment holder is provided with a removable lid or cap, as 12 in which the control mechanism for the perforations is mounted, including the horizontally disposed depressible ring frame 6 and the pins 7. In this form of the invention the ring frame is pivoted at 13 on an interior bracket of the lid, and an alined stem 14 projecting laterally from one side of the ring frame. The ring frame with its pins is suspended in the removable lid by means of the pivot bracket 13 and a coiled spring 15 which connects the frame with the underside of the lid, and as indicated in Fig. 2 the spring 15 retains the pins in the perforations of the lid.

To depress the frame and withdraw the pins from the perforations, the ring frame is provided with a cam edge or cam lug 16 projecting from one side thereof, and a push-pin 17 is mounted in a horizontal slot 18 of the side wall of the lid. The inner end of the push pin, within the lid, is provided with a cam faced lug 19 that frictionally engages the cam face or edge 16 of the ring frame, so that by pushing in on the pin the cam action between the two faces 16 and 19, the ring frame is depressed to swing on its pivotal axis, and withdraw the pins from the perforations of the lid.

Having thus fully described our invention, what we claim as new and desire to secure by Letters Patent is:

In a salt shaker the combination of a removable lid having a series of perforations in the top of the lid, a depressible annular frame within the lid, upright pins mounted on the frame for insertion in the perforations, a spring in tension connecting the frame with the top of the lid, diametrically opposite stems projecting laterally from the frame, means pivotally connecting one of the stems to the lid, a cam portion on the other of the stems, a push-pin reciprocably mounted in the lid, and a cam portion on said push pin for co-action with the cam portion on the other of the stems whereby movement of the push pin into the lid will cause depression of the frame and withdrawal of the pins from the perforations.

ANTHONY J. WYMAN.
ROLAND G. ZIEGLER.

REFERENCES CITED

The following references are of record in the file of this patent:

UNITED STATES PATENTS

| Number | Name | Date |
|---|---|---|
| 572,362 | Loryea | Dec. 1, 1896 |
| 810,107 | Cohencius | Jan. 16, 1906 |
| 1,040,991 | Avram | Oct. 15, 1912 |
| 1,139,841 | Bright | May 18, 1915 |
| 1,238,118 | Edmunds | Aug. 28, 1917 |
| 1,260,726 | Spengler | Mar. 26, 1918 |
| 1,535,597 | Furda | Apr. 28, 1925 |

FOREIGN PATENTS

| Number | Country | Date |
|---|---|---|
| 2,544 | Great Britain | Jan. 31, 1912 |